United States Patent
Buttolph

(10) Patent No.: US 9,494,190 B2
(45) Date of Patent: Nov. 15, 2016

(54) BEARING ASSEMBLY WITH OVERLOAD PROTECTION

(71) Applicant: Simmonds Precision Products, Inc., Vergennes, VT (US)

(72) Inventor: Martin Edwy Buttolph, Middlebury, VT (US)

(73) Assignee: SIMMONDS PRECISION PRODUCTS, INC, Vergennes, VT (US)

( * ) Notice: Subject to any disclaimer, the term of this patent is extended or adjusted under 35 U.S.C. 154(b) by 0 days.

(21) Appl. No.: 14/621,214

(22) Filed: Feb. 12, 2015

(65) Prior Publication Data
US 2016/0238067 A1    Aug. 18, 2016

(51) Int. Cl.
*F16C 19/52*    (2006.01)
(52) U.S. Cl.
CPC .................................. *F16C 19/522* (2013.01)
(58) Field of Classification Search
CPC .................................................... F16C 19/522
See application file for complete search history.

(56) References Cited

U.S. PATENT DOCUMENTS

| | | | | |
|---|---|---|---|---|
| 4,881,828 A | * | 11/1989 | Kato | F16C 13/006 384/127 |
| 4,938,610 A | * | 7/1990 | Kato | F16C 13/006 384/126 |
| 5,690,395 A | * | 11/1997 | Hicks | B60B 33/0028 301/105.1 |
| 6,176,620 B1 | * | 1/2001 | Obara | F16C 21/00 384/127 |
| 2010/0092120 A1 | * | 4/2010 | Nies | F03D 11/0008 384/513 |

* cited by examiner

*Primary Examiner* — Thomas R. Hannon
(74) *Attorney, Agent, or Firm* — Cantor Colburn LLP

(57) ABSTRACT

A bearing assembly is described that includes a shaft and an inner race affixed to the shaft. An outer race is disposed radially around the inner race defining a bearing run space with rolling elements between the inner and outer races. An axial bore in the support or the rotor has a radial gap between the bore wall and the outer race, and the assembly is configured to provide a radial displacement between a portion of the outer race and the axial bore wall in response to a radial overload force applied to the rotor.

13 Claims, 4 Drawing Sheets

BEARING ASSEMBLY WITH OVERLOAD PROTECTION

BACKGROUND OF THE INVENTION

Bearing assemblies are widely used to provide engagement between a rotating component or assembly (i.e., a rotor) and a support structure. Bearing assemblies are typically designed to handle peak operating loads on the bearing assembly without damage or deformation to the bearings and the supporting raceway structure. However, in many applications, non-operating loads (for instance from shock) when the mechanism is not rotating can be much greater than peak operating loads. In such a case, the structure of the bearing assembly can be subject to an overload condition. This problem is particularly acute for projectile launch mechanisms where the launch loads can be orders of magnitude higher than the operating load. In an overload condition, an overload load applied onto the bearing assembly is transmitted through one of the bearing races, the rolling elements, and the other bearing race. This transmission of the overload through the bearing can result in deformation of components in the bearing assembly that can lead to bearing failure.

BRIEF DESCRIPTION OF THE INVENTION

According to some aspects of the invention, a bearing assembly provides engagement of a rotor and a support. The bearing assembly comprises a shaft and an inner race affixed to the shaft. An outer race is disposed radially around the inner race, and the inner and outer races together define a bearing run space between the inner and outer races with rolling elements in the run space. Either the shaft along with the inner race, or the outer race is attached to and configured to rotate with the rotor, and whichever of the shaft or the outer race is not attached to the rotor is attached to the support. A first axial bore in the support or in the rotor accommodates the outer race, with a first portion of the outer race disposed in and attached to the first axial bore. A second axial bore is in the support if the outer race is attached to the rotor or the second axial bore is in the rotor if the outer race is attached to the support. A second portion of the outer race is disposed in the second axial bore with a radial gap between a wall of the second axial bore and the second portion of the outer race. The assembly is configured to provide a radial displacement between the second portion of the outer race and the second axial bore wall in response to a radial overload force applied to the rotor.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
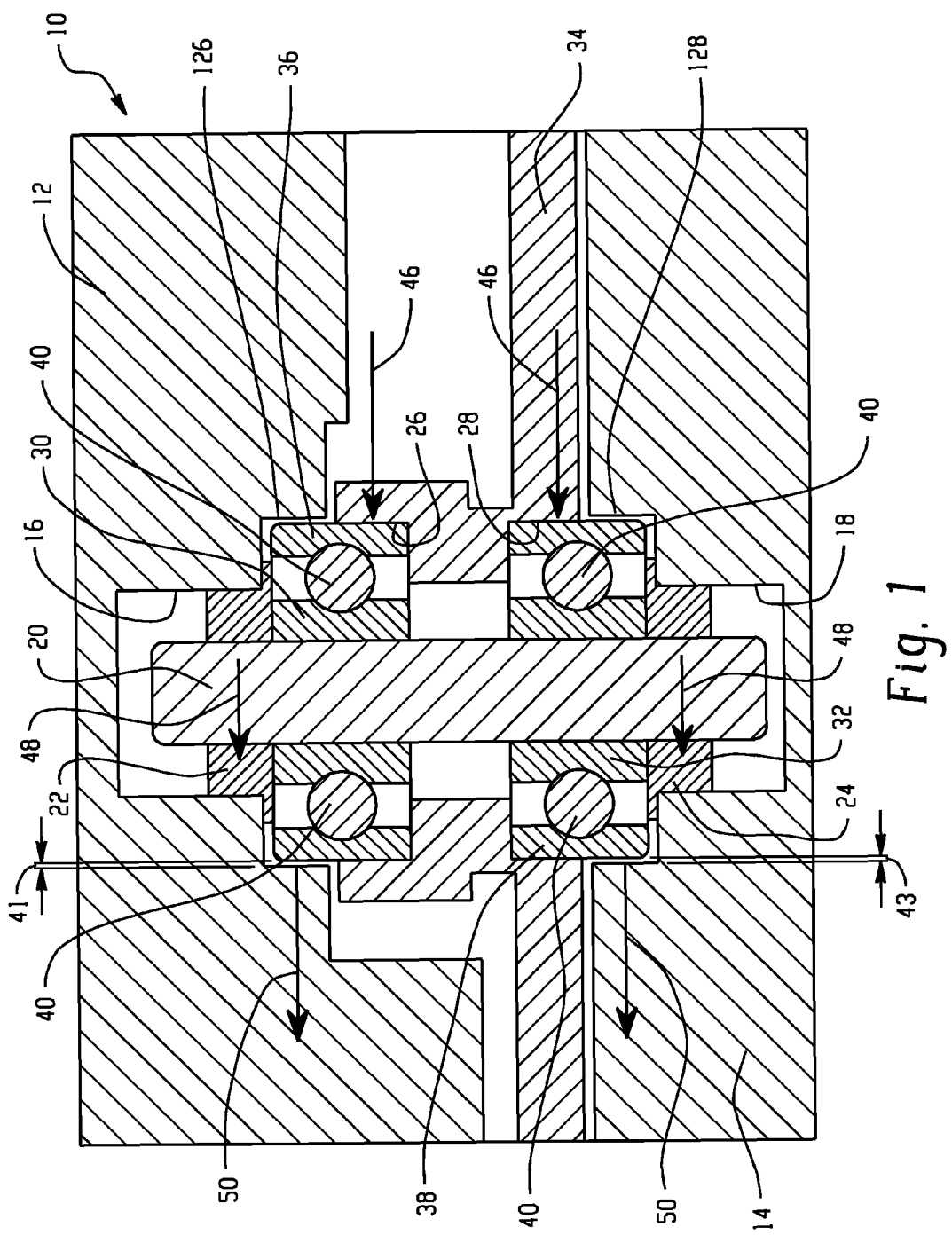
FIG. 1 is a schematic depiction of an exemplary bearing assembly as further described herein.

Referring now to the Figures, FIG. 1 depicts a schematic representation of exemplary bearing assembly 10. As shown in FIG. 1, the bearing assembly 10 includes an upper support structure 12 and a lower support structure 14. During assembly, upper and lower support structures 12, 14 are joined together to form a single support structure. Such a joining of support structures is exemplary, and in some embodiments, the support structure can be cast or fabricated as a single component or can be formed from more than two sub-structures or sub-assemblies. Upper and lower support structures 12, 14 each respectively has a bore 16, 18 in which a bearing support shaft 20 is secured in compliant bushings 22, 24. Inner races 30, 32 are attached to the bearing support shaft 20 and together with outer races 36, 38 form a bearing raceway path for rolling elements 40. It should be noted here that although FIG. 1 depicts two sets of races, the invention can be practiced with only a single set of races and rolling elements, or with more than two sets of races and rolling elements. A rotor 34, such as a gear, flywheel, or any other rotating component, is disposed about the shaft 20. Outer races 36, 38 are each respectively disposed in a central axial bore 26, 28 (i.e., the "first" bore, in this case) in the rotor 34, and are attached to the rotor so that they rotate with the rotor. The inner and outer races 30, 32, 36, 38, together with the rolling elements 40 provide a rotatable engagement between the shaft 20 and the rotor 34.

Upper and lower support structures 12, 14 each also respectively includes a bore 126, 128 having a greater width or diameter than the bore 16, 18 to accommodate the outer races 36, 38. This embodiment is of course exemplary, and embodiments are also contemplated where a single bore is used instead of the two-bore configurations depicted for bores 16/126 and 18/128. The races, and in particular the portion of the outer races 36, 38 that extends axially from the rotor bores 26, 28 are disposed in each of the bores 126, 128 (i.e., the "second" bore, in this case). The bores 126, 128 and the outer races 36, 38 are configured so that there are clearance gaps 41, 43 between races and the bore wall. It should be noted that, as used herein, the term "axial" refers to a direction parallel to the axis of rotation of the rotor or to an axis parallel to the axis of rotation of the rotor, and the term "radial" refers to a direction transverse to the axis of rotation of the rotor.

In performance of the device, a radial load such as a non-operating radial shock load from a projectile launcher can be transmitted through the rotor 34 and to the outer races 36, 38 along vectors 46. In a conventional bearing assembly design, this radial load would be transmitted through the races and rolling elements to the shaft and then to the support structure, subjecting the races and rolling elements to potentially damaging radial overload conditions. With the assembly of FIG. 1, a radial load will first load up the bearing assembly and cause radial displacement, allowed by compliant bushings 22, 24, of the shaft 20 and the inner and outer races 30, 32, 36, 38 along vectors 48. This load does pass through both the races and the rolling elements, but the load during radial displacement of the shaft 20 can be limited to a value within the capacity of the bearing assembly to prevent damage to the races and rolling elements.

In the exemplary embodiment of FIG. 1, the shaft 20 and the positioning and characteristics of its attachment to the supports 12, 14 or bushings 22, 24 can be configured to provide desired compliant characteristics to displace under radial load within the capacity of the bearing assembly.

Figure 2:
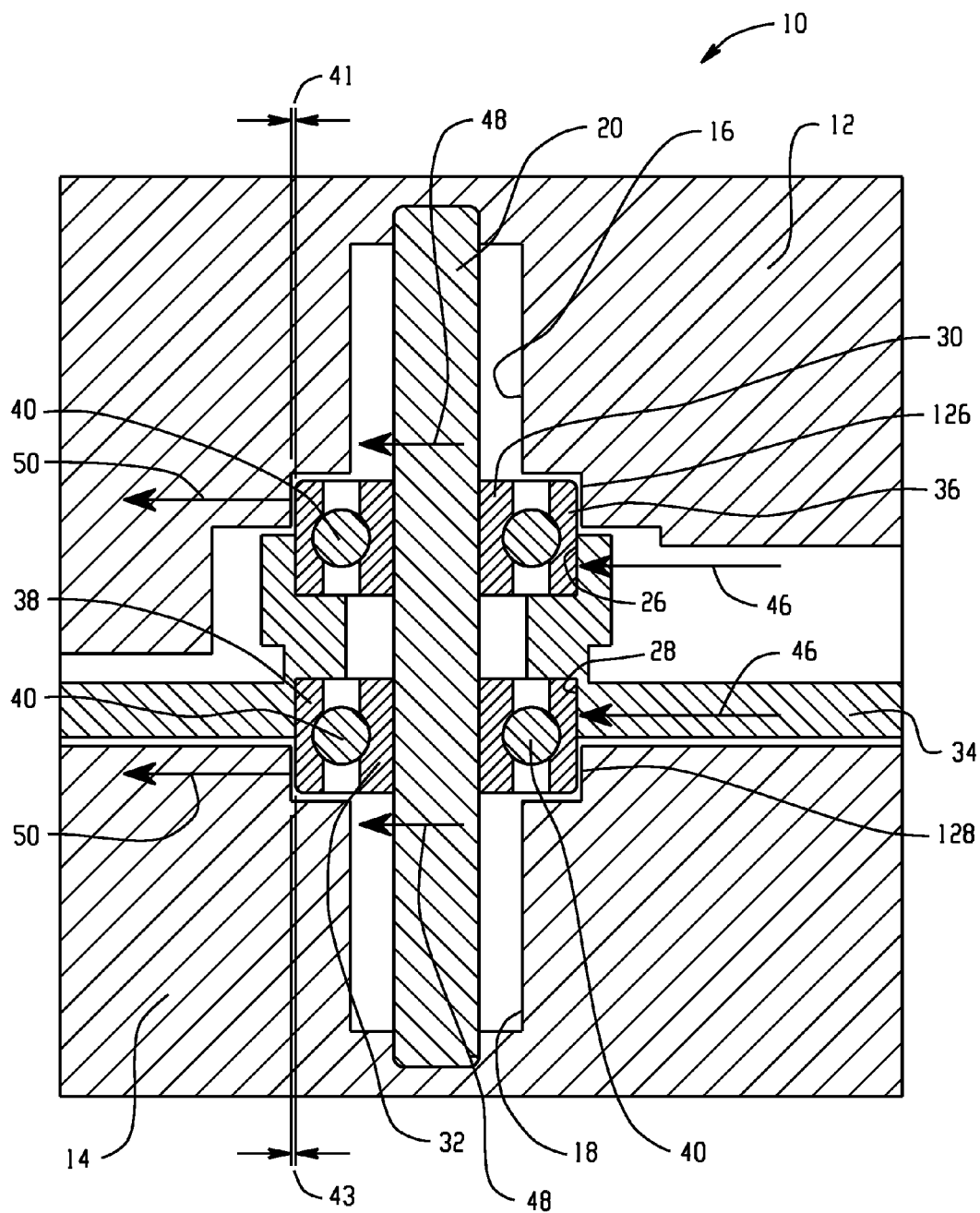
FIG. 2 is a schematic depiction of an exemplary bearing assembly as further described herein.

However, in some embodiments, design parameters such as the combined flexibility/stiffness of the shaft and outer races 20 36, 38, and the axial distance between the fixed mounts of the shaft 20 and the inner races 30, 32 where shaft 20 receives the radial load, can provide the desired radial displacement through elastic deformation of the shaft, races, or other components. Such an embodiment is depicted in FIG. 2 where the shaft 20 is mounted directly in the bores 16, 18. The exemplary embodiment of FIG. 2 is configured and operates in similar fashion to FIG. 1, except that no compliant bushings are used, and compliance to radial displacement of the shaft is provided by the above-mentioned factors.

When the radial load is sufficiently high, the radial displacement of the shaft 20 and inner and outer races 30, 32, 36, 38 will equal the dimension of the gaps 41, 43, and the outer races 36, 38 will come to a stop by contacting the walls of bores 26, 28. The dimension of gaps 41, 43 can vary depending on many factors such as the design specifications and tolerances of any or all of the shaft, races, bearings, rotor, and support, normal and peak operating loads, and anticipated non-operating loads (e.g., shock loads). In some embodiments, the gap can range from 0.0005 inches (12.7 µm) to 0.005 inches (0.127 mm). In some embodiments, the gap can range from 0.005 inches (0.127 mm) to 0.025 inches (0.635 mm). Controlling the shunting clearance gap is important for at least two reasons. First, it allows the amount of overload on the bearing to be designed to a value close to the peak operating load of the mechanism, thereby allowing the use of bearings that, while able to support the mechanism operating load, require little margin above that. Second, it allows the use of a very stiff compliant behavior, which more closely controls the spinning part's location under load, and raises the frequency at which vibrational resonance would occur.

In the condition where outer races 36, 38 have been displaced by radial load to contact the walls of bores 126 and 128, continued radial load applied along vectors 46 is off-loaded from the outer races 36, 38 to the support 12, 14 along vectors 50, which are axially displaced from the incoming load along vectors 46. At least a portion of the radial load is transferred through the outer races 36, 38 to the support wall in bores 126, 128, instead of through the rolling elements 40. The relative portion of the radial load transferred through the outer races to the support instead of through the rolling elements 40 can be configured with various design features. For example, relative axial position of the outer races 36, 38 or the rolling elements 40 with respect to the rotor bores 26, 28 and the bore 126, 128 can impact the distribution of load. In some exemplary embodiments, a portion of the rolling elements is axially outside of the bores 126, 128. In some exemplary embodiments, the rolling elements 40 have an axial center line that is outside of the bores 126, 128, respectively. In some exemplary embodiments, the rolling elements 40 have an axial center line that is inside of the rotor bores 26, 28, respectively. The axial position of the rolling elements 40 can be provided by design features such as the axial positioning of the races. For example, the relative depths of the rotor bores 26, 28 and bores 126, 128 can be configured to provide a specified axial position of the outer races 36, 38 with respect to the bores 126, 128. In some exemplary embodiments, the outer races 36, 38 have an axial center line that is outside of the bores 126, 128, respectively. The races themselves can also be designed to be resistant to deformation under radial load, which can also facilitate transfer of radial load directly through the outer race. For example, in some embodiments, the outer races 36, 38 can include a radially-projecting flange to stiffen and strengthen the race.

Figure 3:
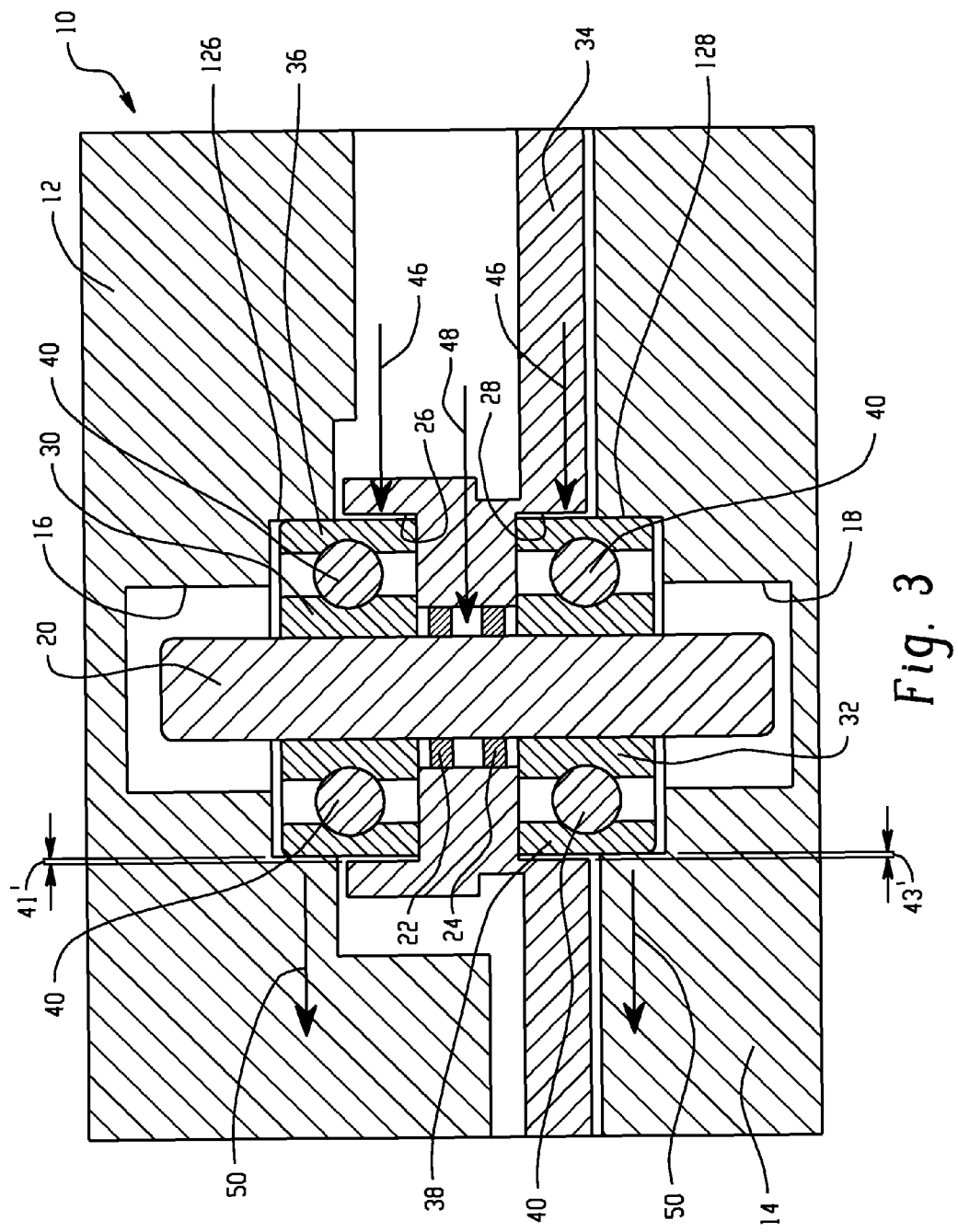
FIG. 3 is a schematic depiction of an exemplary bearing assembly as further described herein.

In another exemplary embodiment as depicted in FIG. 3, the shaft 20 is attached to the rotor 34 through compliant bushings 22 and 24, and the outer races 36, 38 are attached to the support 12, 14 in bores 126, 128 (i.e., the "first" bore, in this case) which are now tight fit. The outer races 36, 38 project axially into rotor bores 26, 28 (i.e., the "second" bore, in this case), with a gap 41', 43' between the wall of the axial bores 26, 28 and the outer races 36, 38. During a radial overload, the rotor displaces radially along vector 48 against compliant bushings 22, 24 until the walls of the axial rotor bores 26, 28 make contact with the outer races 36, 38. In that condition of radial displacement with the bore walls of rotor 34 seated on the outer races 36, 38, further radial load is transferred out through outer races 36, 38 to the support 12, 14.

Figure 4:
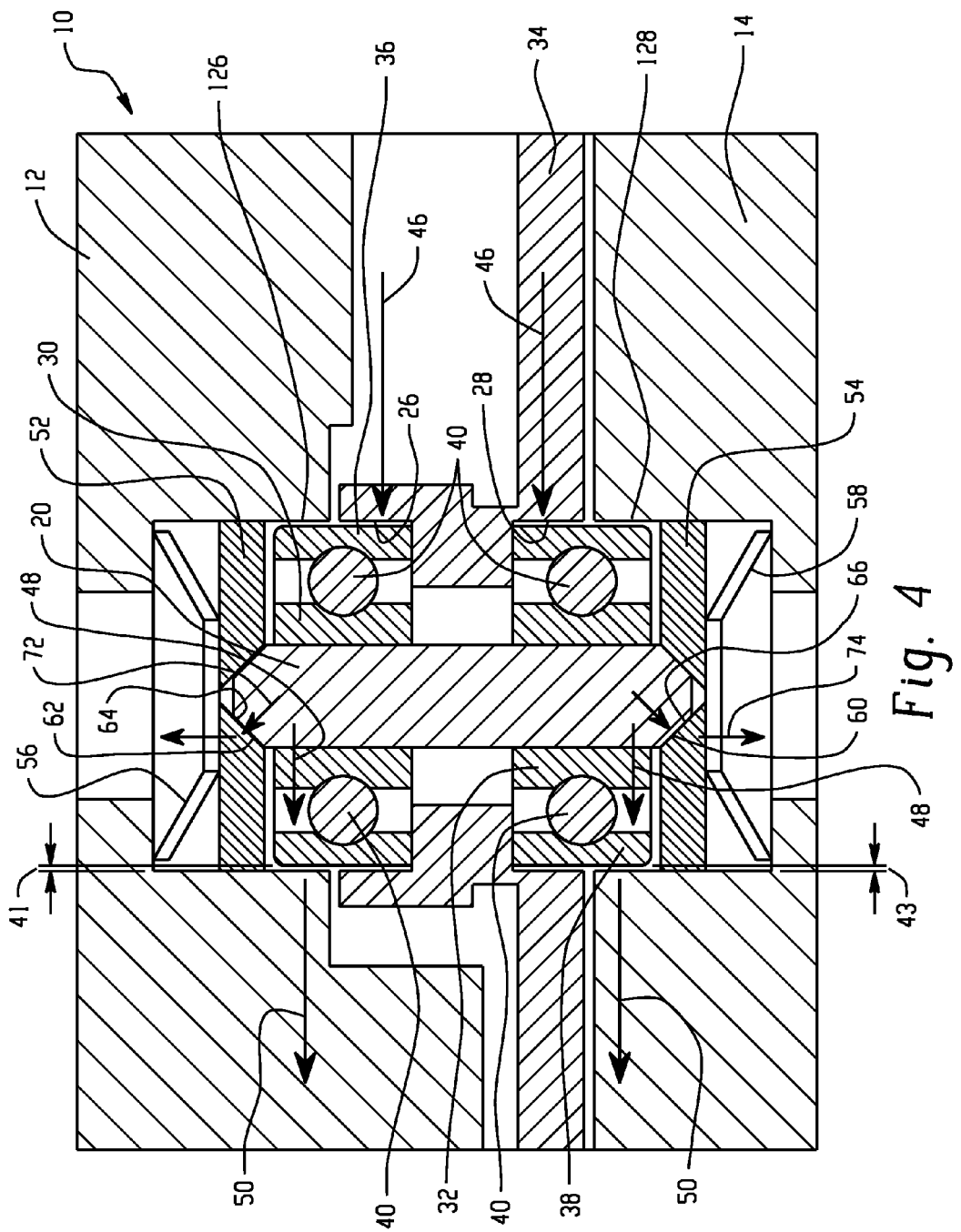
FIG. 4 is a schematic depiction of an exemplary bearing assembly as further described herein.

In some applications where radial motion of the rotating components must be kept to a minimum, for example to improve accuracy or for resonance and frequency parameters, a non-linear or pre-loaded compliance response to radial displacement can be used. Such an exemplary embodiment is depicted in FIG. 4, which uses many of the same structural features as FIG. 1, as indicated by the use of the same reference numerals. Further detailed explanation of such common features is not necessary, as they have been described above. The exemplary embodiment of FIG. 4 differs from FIG. 1 in that it does not include a compliant bushing to allow for radial displacement of the shaft 20 in response to radial overload. In FIG. 4, the ends of the shaft 20 are slideably seated against conical bushings 52, 54, which are biased toward the shaft 20 with biasing elements 56, 58 such as coil springs, which can be integrated with or separate from the conical bushings. Angled surfaces 60 and 62 on the shaft 20 engage with angled surfaces 64 and 66, respectively, on the conical bushings 52, 54 such that when a radial load is applied along vectors 46, radial displacement of the shaft 20 along vectors 48 acting along the interface between the angled surfaces will displace the conical bushings 52, 54 axially away from the center of shaft 20, resulting in a transfer of load along vectors 72 and 74. The motion of the conical bushing results from transfer of part of the radial load in an axial direction along vectors 68, 70 through the angled interfaces between shaft 20 and conical bushings 52, 54. The properties of biasing elements 56 and 58 can be adjusted to provide a targeted response in conjunction with a targeted radial displacement limit from gaps 41, 43 for the components of the bearing assembly 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A bearing assembly for providing engagement of a rotor and a support, comprising:
a shaft;
an inner race affixed to the shaft;

an outer race disposed radially around the inner race, the inner and outer races together defining a bearing run space between the inner and outer races; and rolling elements in the bearing run space;

wherein one of: (i) the shaft along with the inner race or (ii) the outer race, is attached to and configured to rotate with the rotor, and the other of (i) the shaft along with the inner race or (ii) the outer race, is attached to the support;

a first axial bore that is in the rotor if the outer race is the rotor or is in the support if the outer race is attached to the support;

a second axial bore that is in the support if the outer race is attached to the rotor or is in the rotor if the outer race is attached to the support; and wherein a first portion of the outer race is disposed in the first axial bore, and a second portion of the outer race is disposed in the second axial bore with a radial gap between a wall of the second axial bore and the second portion of the outer race; and further wherein the assembly is configured to provide a radial displacement between the second portion of the outer race and the second axial bore wall in response to a radial overload force applied to the rotor.

2. The assembly of claim 1, further comprising a compliant bushing engaged with the shaft to provide said radial displacement.

3. The assembly of claim 1, wherein the shaft has flexibility to provide said radial displacement.

4. The assembly of claim 1, wherein at least a portion the rolling elements extends axially from the first or second axial bore that is in the support.

5. The assembly of claim 4, wherein the rolling elements have an axial center line that is outside of the first or second axial bore that is in the support.

6. The assembly of claim 1, wherein the outer race has an axial center line that is outside of the first or second axial bore that is in the support.

7. The assembly of claim 1, wherein the shaft along with the inner race is attached to and configured to rotate with the rotor.

8. The assembly of claim 1, wherein the outer race is attached to and configured to rotate with the rotor.

9. The assembly of claim 8, further comprising a cooperating member that is axially displaceable in response to radial displacement of the shaft.

10. The assembly of claim 9, wherein the shaft includes a first engagement surface at an angle between the radial and axial directions, and the cooperating member includes a second engagement surface.

11. The assembly of claim 10, further comprising a biasing element against axial displacement of the cooperating member.

12. The assembly of claim 9, further comprising a biasing element against axial displacement of the cooperating member.

13. A method of using the assembly of claim 1, comprising applying a radial load to the rotor, thereby causing radial displacement of the rotor up to a point of contact of the outer race with the axial bore wall; and transferring the radial load from the rotor through the outer race to the axial bore wall in contact with the outer race.

* * * * *